United States Patent
Shen et al.

(10) Patent No.: US 11,642,854 B2
(45) Date of Patent: May 9, 2023

(54) ADDITIVE MANUFACTURING PATH GENERATION

(71) Applicant: Arris Composites Inc., Berkeley, CA (US)

(72) Inventors: Yang Shen, El Cerrito, CA (US); J. Scott Perkins, Oakland, CA (US); Riley Reese, Oakland, CA (US); Erick Davidson, Piedmont, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 17/838,018

(22) Filed: Jun. 10, 2022

(65) Prior Publication Data
US 2022/0396036 A1    Dec. 15, 2022

Related U.S. Application Data

(60) Provisional application No. 63/209,133, filed on Jun. 10, 2021.

(51) Int. Cl.
*B29C 64/393*    (2017.01)
*B33Y 10/00*    (2015.01)
(Continued)

(52) U.S. Cl.
CPC ............ *B29C 64/393* (2017.08); *B33Y 10/00* (2014.12); *B33Y 50/02* (2014.12); *B33Y 80/00* (2014.12);
(Continued)

(58) Field of Classification Search
CPC ....... B29C 64/393; B33Y 10/00; B33Y 50/02; B33Y 80/00; G06F 30/12; G06F 2111/04; G06F 2113/10
See application file for complete search history.

(56) References Cited

U.S. PATENT DOCUMENTS

2019/0299523 A1\* 10/2019 Wu ................. B29C 64/209
2021/0026323 A1\* 1/2021 Chen ................. G06F 30/23
(Continued)

FOREIGN PATENT DOCUMENTS

WO    2022/261497    12/2022

OTHER PUBLICATIONS

Authorized Officer Tanja Ruhrmund, International Search Report and Written Opinion issued in PCT Patent Application No. PCT/US2022/033103 dated Sep. 20, 2022.
(Continued)

*Primary Examiner* — Thomas C Lee
*Assistant Examiner* — Anzuman Sharmin
(74) *Attorney, Agent, or Firm* — Kaplan Breyer Schwarz, LLP

(57) ABSTRACT

A system and methods are disclosed for producing components via additive manufacturing. In one embodiment, a three-dimensional geometry is sliced using a slicing plane to obtain a first two-dimensional geometry. A first polyline is generated based on a first skeleton of the first two-dimensional geometry, and a first slender body is generated based on the first polyline. The first slender body is subtracted from the first two-dimensional geometry to obtain a second two-dimensional geometry. A second polyline is generated based on a second skeleton of the second two-dimensional geometry. A first bundle of fibers is produced based on a segmentation of the first polyline and a second bundle of fibers is produced based on a segmentation of the second polyline. A component is produced from the first and second bundles of fibers using an additive manufacturing process.

18 Claims, 12 Drawing Sheets

(51) Int. Cl.
*B33Y 50/02* (2015.01)
*B33Y 80/00* (2015.01)
*G06F 30/12* (2020.01)
*G06F 111/04* (2020.01)
*G06F 113/10* (2020.01)

(52) U.S. Cl.
CPC .......... *G06F 30/12* (2020.01); *G06F 2111/04* (2020.01); *G06F 2113/10* (2020.01)

(56) References Cited

U.S. PATENT DOCUMENTS

2021/0042455 A1* 2/2021 Ulu ..................... B29C 64/321
2021/0347108 A1* 11/2021 Bressler ................ B29C 64/35

OTHER PUBLICATIONS

Breuss Michael et al., A simple approach to stiffness enhancement of a printable shape by Hamilton-Jacobi skeletonization, Apr. 26, 2020, Procedia Manufacturing 47:: 43rd North American Manufacturing Research Conference, NAMRC 43, Jun. 8-12, 2015, UNC Charlotte, North Carolina, United States, pp. 1190-1196, vol. 47, https://www.sciencedirect.com/science/article/pii/S2351978920312038?via%3Dihub.

Donghong Ding et al., Advanced Design for Additive Manufacturing: 3D Slicing and 2D Path Planning, Jul. 13, 2016, In "New Trends in 3D Printing" InTech XP055960107.

Wang Ting et al., Load-dependent path planning method for 3D printing of continuous fiber reinforced plastics, Oct. 28, 2020, Composites Part A: Applied Science and Manufacturing, Elsevier, Amsterdam, NL, vol. 140.

* cited by examiner

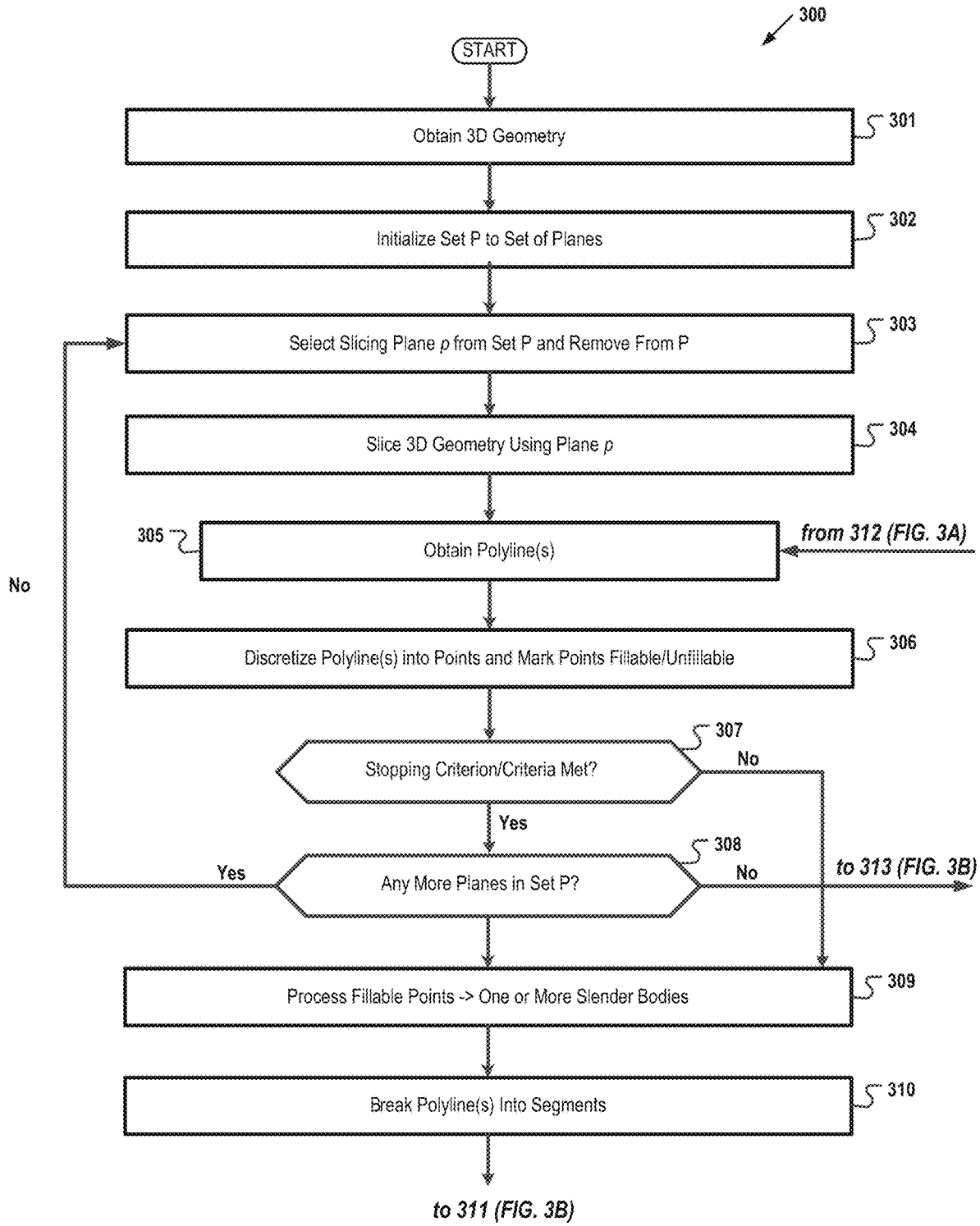

ADDITIVE MANUFACTURING PATH GENERATION

STATEMENT OF RELATED APPLICATIONS

The present application claims priority to, and incorporates fully by reference, U.S. Provisional Patent Application No. 63/209,133 filed Jun. 10, 2021.

FIELD OF THE INVENTION

The present disclosure relates to additive manufacturing, and more particularly, to generating paths for additively manufacturing components.

BACKGROUND

In subtractive manufacturing processes such as computer numerical control (CNC) systems, a cutting tool removes material as it moves along a path, thereby forming a resultant component. The path of the cutting tool may be referred to as a tool path.

In 3D printing, an additive manufacturing process, a printer head extrudes material as it moves along a path. The path of the printer head may similarly be referred to as a tool path.

SUMMARY

Embodiments of the present disclosure provide methods for generating paths for additive manufacturing of components. The paths pertain to the configuration of molding constituents. In the case of 3D printing, one type of additive manufacturing, the path is the tool path. In the case of Arris Additive Molding (AAM), a different, proprietary type of additive manufacturing, the path is the geometry of a bundle of fibers (referred to as a preform). Such preforms are feed constituents for a fabricated component.

Embodiments of the present disclosure comprise a first method for generating "preform path geometries and layouts, and a second method for generating 3D printing tool paths, where the generated paths result in components exhibiting good (ideally optimal) performance in terms of one or more component properties, subject to one or more constraints (e.g., manufacturing constraints, loading condition(s), boundary condition(s), geometric constraint(s), etc.).

BRIEF DESCRIPTION OF THE DRAWINGS

FIGS. 3A and 3B depict a flow diagram of aspects of a method for generating one or more preform paths and manufacturing a compression-molded component using these preform path(s), in accordance with one embodiment of the present disclosure.

DETAILED DESCRIPTION

Embodiments of the present disclosure are directed to the design of components to be manufactured by compression molding, and in particular, embodiments of the present disclosure can be used to design compression-molded components having complex geometries and/or using complex materials, such as fiber-reinforced polymers (FRPs) having long fibers, as well as other types of anisotropic materials (i.e., materials whose physical properties change with direction).

Arris Additive Molding (AAM) Technology is an additive manufacturing process that utilizes anisotropy produce components with desired properties. In AAM, material is loaded into a mold, and a molding apparatus applies heat and pressure to form a compression-molded component. The material may comprise one or more "preforms," each of which is a sized and shaped portion of a bundle of fibers. Once the applied heat has increased the material's temperature above its melt temperature, the material is no longer solid and conforms to the mold geometry via the applied pressure. The material is held above its melt temperature at full consolidation for a short period of time known as the "soak" phase, and heat is then removed from the mold until the material has adequately cooled. The material is fully consolidated at this point, wherein void space is reduced to a minimum and the material has been pressed into the shape of a component corresponding to the mold. Having attained its final geometry, the finished component is ejected from the mold and is ready for use.

Figure 1:
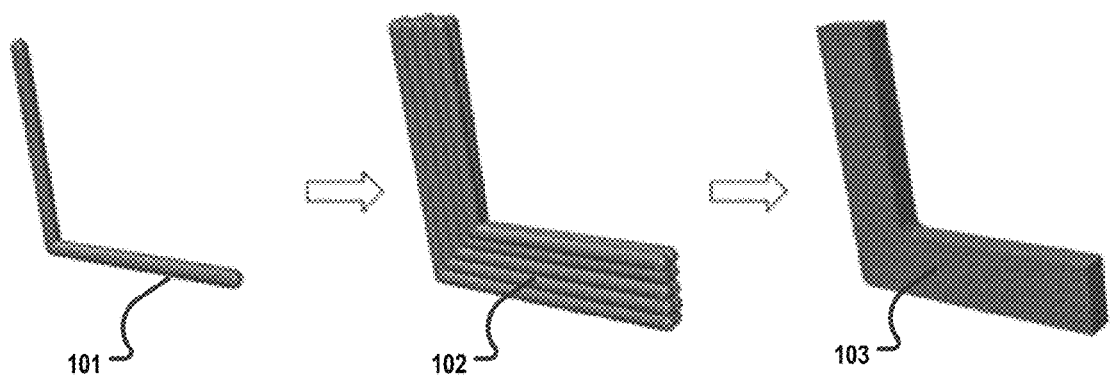
FIG. 1 depicts an example of a process by which plural preforms are arranged to form a preform charge resembling the topology of a desired component, in accordance with one embodiment of the present disclosure.

The process of designing preforms in AAM comprises arranging a plurality of preforms into an assemblage that resembles the topology of a desired component. We refer to the assemblage of preforms as a "preform charge." An example of a preform charge is shown in FIG. 1. In this example, a preform 101 is aggregated with one or more other preforms (not depicted in the figure) to form a preform charge 102, and a component 103 is produced from the preform charge 102 via the process disclosed above.

The manner in which preforms are arranged to form a preform charge can be critical. In accordance with embodiments of the present disclosure, preference is given to preforms that (1) have a slender body with large aspect ratio (i.e., aspect ratio defined as the ratio of length to cross section), and (2) can accommodate multiple bends such that continuous fibers are aligned to its major axis. A slender preform can be idealized as a polyline with a thickness/diameter, or more generally, a one-dimensional curve with a thickness/diameter. Representing a preform as a polyline enables constraints (e.g., manufacturing constraints, etc.) to be incorporated.

In the AAM process, there is no tool path, as in CNC and 3D printing. However, the resultant geometry of a preform, and the orientation of the preform in a mold, can be thought of as a path, and thus the problem of how to design the geometry of a given preform can be framed as how to generate a path for the preform.

In accordance with embodiments of the present disclosure, the problem of how to generate preform paths is formulated as follows: given an arbitrary two-dimensional or three-dimensional geometry, how can the geometry be partitioned into a set of one or more slender bodies (e.g., polylines with thickness, etc.), each of which could be a different shape, to fill in the geometry such that one or more objectives and/or one or more constraints (e.g., manufacturing constraints, etc.) are met?

Figure 2:
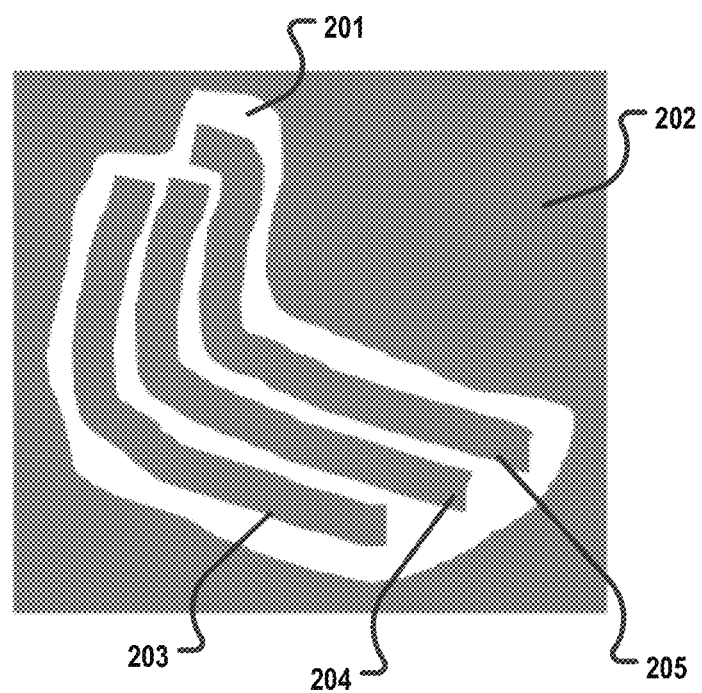
FIG. 2 depicts an example in which a two-dimensional geometry is filled by continuous slender bodies, in accordance with one embodiment of the present disclosure.

An example of filling a two-dimensional geometry with a set of slender bodies is shown in FIG. 2. As shown in the figure, a cavity 201 of a mold 202 is filled with three slender bodies 203, 204, and 205.

Embodiments of the present disclosure are capable of working with objectives that (1) can result in superior component properties, and/or (2) cannot be dealt with by methods and manufacturing technologies of the prior art, including CNC and 3D printing. Examples of such objectives include maximizing continuity, maximizing strength, maximizing specific strength, maximizing stiffness, maximizing specific stiffness, maximizing thermal stability, maximizing impact resistance, minimizing cost (e.g., use cheaper materials in regions having lower performance, etc.), maximizing radio-frequency transparency, maximizing surface finish aesthetic quality and/or consistency, maximizing dimensional accuracy, and so forth.

Embodiments of the present disclosure are further capable of handling constraints that cannot be dealt with by methods of the prior art. Examples of such constraints include manufacturing constraints, loading condition(s), boundary condition(s), geometric constraint(s), and so forth.

Embodiments of the present disclosure are further capable of working with a plurality of objectives and/or a plurality of constraints (e.g., manufacturing constraints, etc.). Accordingly, embodiments of the present method are capable of: (1) producing components that satisfy a plurality of specified constraints; and/or (2) producing components in view of a plurality of objectives (e.g., a first objective for a first property of the component and a second objective for a second property of the component; a first objective for a property of the component and a second objective for the manufacturing process producing the component; two objectives for a given property of the component; two objectives for the manufacturing process producing that component; three respective objectives for three different properties of the component; etc.).

Figure 3B:
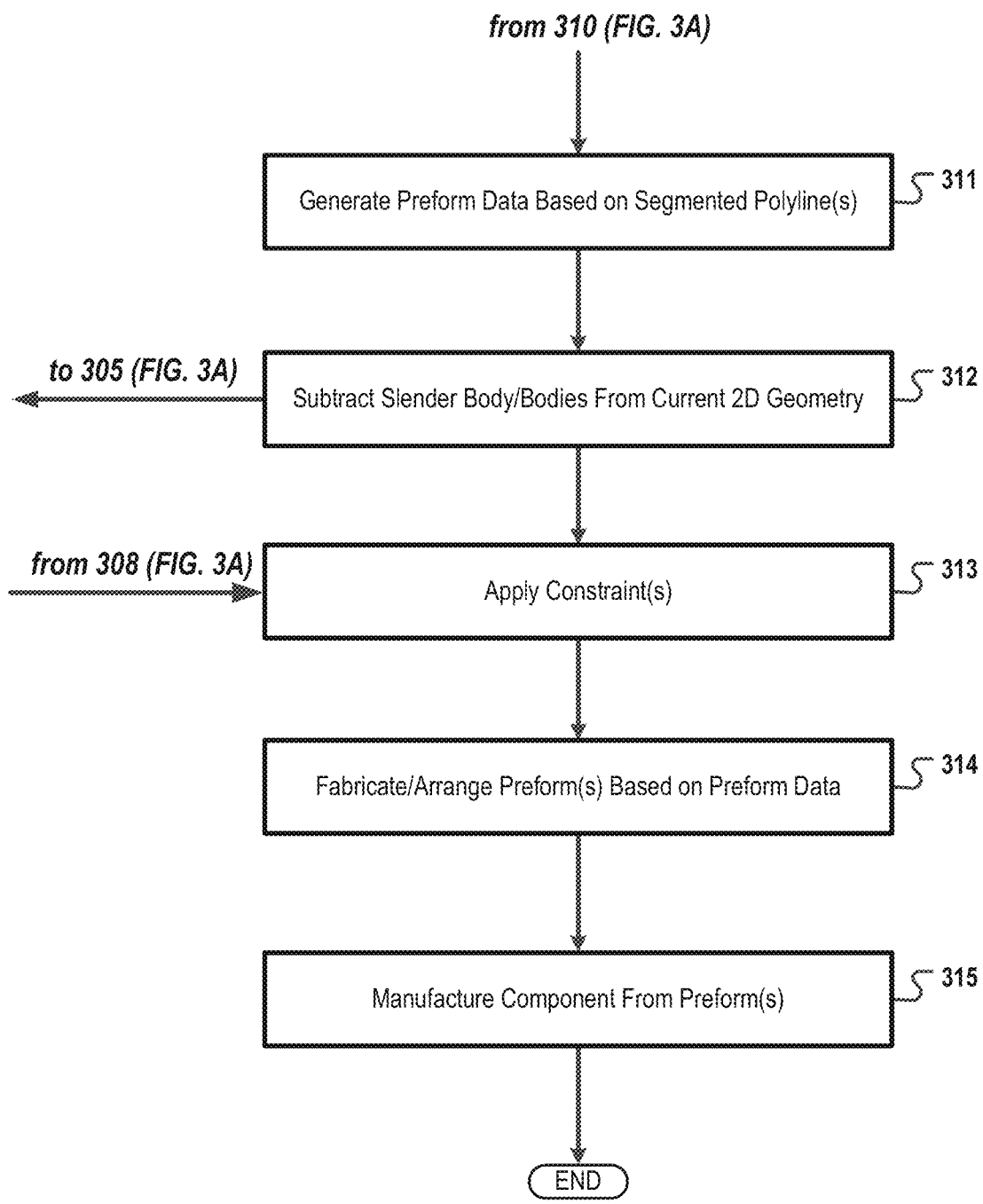

Embodiments of the present disclosure—and in particular, embodiments of the method of FIGS. 3A and 3B— can be used to solve the partitioning problem identified above: namely, how to partition an arbitrary geometry into a set of one or more slender bodies, such that the orientation(s) of the slender body/bodies collectively achieve good (and ideally optimal) performance with respect to one or more objectives, while also adhering to one or more constraints (e.g., manufacturing constraints, etc.). The method of FIGS. 3A and 3B (hereinafter referred to as "the present method") employs a variety of techniques:

Skeletonization
   In accordance with embodiments of the present disclosure, a skeleton of a two-dimensional geometry is obtained by an iterative shrinking of the boundaries of the two-dimensional geometry until the boundaries meet. This process, referred to as skeletonization, is analogous to fire propagation in a grass field having the form of the given two-dimensional geometry, in that if all points on the boundaries of the grass field are set on fire simultaneously, then the skeleton is the set of quench points (i.e., those points where two or more wavefronts meet). Skeletonization can be implemented in digital image processing to transform a digital image into a binary image, thereby yielding a skeleton that largely preserves the extent and connectivity of the original region while discarding many of the original foreground pixels. A related technique in digital image processing is medial axis transformation (MAT), in which pixels of an image are transformed to grayscale values rather than binary.

Distance Function
   In accordance with embodiments of the present disclosure, the skeletonization process employs a distance function that computes the shortest distance of a point in the two-dimensional geometry to the contour of the geometry. Using a distance function is superior to using an offset of the contour, in that when a distance function is applied iteratively it can be used to solve a wider range of two-dimensional spaces in a manner compatible with AAM. It should be noted that the contour of the two-dimensional geometry changes with successive iterations.

Polylines
   Polylines are used to translate skeletons into explicit mathematical representations. This "polyline-ization" provides at least two benefits: (1) it can be used to define slender bodies, and (2) it yields a set of linear equations that accurately describes the physical nature of preforms.

Constraints
   By using mathematical representations (e.g., a set of linear equations representing polylines, as disclosed above, etc.) the present method is capable of applying constraints (e.g., manufacturing constraints, etc.) mathematically to ensure, for example, preform manufacturability (e.g., adding inequalities to a set of equations to enforce thresholds/ranges, etc.). One example of a manufacturing constraint is that the angle between any two adjacent segments of the polyline must be within the bender's angular capability range for shaping preforms (e.g., minimum and/or maximum angles, minimum and/or maximum bend radii, etc.). A second example of a manufacturing constraint is the requirement that the spatial locations of endpoints of the polyline comply with minimum and/or maximum preform overlap lengths and a given preform discontinuity distribution. As a third example, there may be minimum and maximum lengths between any two bends (or bend and cut) that the polyline segment lengths must adhere to, and as a fourth example, there may be a minimum and/or maximum number of bend angles in the polyline.

Iterative Process Initiation
   The present method is capable of operating on a user-defined first iteration or an automated first iteration that is not solely geometric in nature. For example, a user may define a polyline in the first iteration based on stresses, which do not always correlate to geometry. Accordingly, subsequent automated iterations can build off of a space that is derived from stresses as well as from pure geometry. This capability also enables the use of finite element analysis (FEA) to inform the skeletonization process.

In accordance with embodiments of the present disclosure, generated preform paths are not necessarily continuous in the same way that CNC and 3D printing tool paths are continuous. For example, a preform path may be divided into two or more segments in view of one or more manufacturing constraints. The present method attempts, as much as possible, to place the segment breakpoints in non-critical conjunction areas, thereby reducing (ideally minimizing) adverse effects on mechanical properties due to discontinuity in materials.

In one implementation, an outer loop slices a three-dimensional geometry and computes a two-dimensional intersection. An inner loop computes the skeleton of the 2D geometry and subsequently, in an iterative manner, spreads out the skeleton to the outermost contour of the intersection in an attempt to maximize continuity of materials at critical conjunction areas.

The present method is strongly coupled to anisotropic properties of the materials. A user can specify an orientation to initiate the iterative process, instead of starting with the skeleton of the geometry. In this way, the method can generate a preform path that follows user-defined orientation at the proximity of the polyline while still adhering to the contour at the proximity of the contour.

The polyline specification can be an explicit mathematical definition of a preform, and thus can be subjected to various manufacturing constraints unique to the AAM manufacturing process.

Advantageously, the present method can be adapted to manufacturing components via 3D printing, as well as to additive manufacturing technologies in general. The 3D printing method is disclosed below with respect to FIGS. 7A and 7B, and the generalized method is disclosed below with respect to FIGS. 8A and 8B.

FIGS. 3A and 3B depict a flow diagram of aspects of a method 300 for generating one or more preform paths and manufacturing a compression-molded component using these preform path(s), in accordance with one embodiment of the present disclosure. It should be noted that in some implementations, one or more blocks depicted in FIGS. 3A and 3B might be performed simultaneously, or in a different order than that depicted. In addition, while a single execution of the method is depicted in FIGS. 3A and 3B, the method may be performed multiple times (e.g., a pre-determined number of times, an infinite loop, etc.). It should further be noted that while method 300 is disclosed in the context of AAM, the method is not necessarily restricted to AAM, and might be used to produce components via other additive manufacturing technologies.

At block 301, a three-dimensional geometry is obtained (e.g., from a Computer-Aided Design [CAD] file, from a digital three-dimensional model, etc.).

At block 302, a set P is initialized to a set of one or more slicing planes. In some embodiments, the slicing planes are stacked in parallel fashion (i.e., having the same orientation), while in other embodiments two or more of the slicing planes might have different orientations. In the latter case, the planes/orientations might be defined by a user, or algorithmically.

At block 303, a slicing plane p in set P is selected and removed from P.

At block 304, a slicing of the three-dimensional geometry is performed in a specified direction using slicing plane p, such that the intersection of p and the three-dimensional geometry yields a two-dimensional geometry. In one embodiment, the specified direction is provided by a user (e.g., at block 301; at block 302; at another block not depicted in FIGS. 3A and 3B that is executed prior to executing block 302; etc.). In one implementation, when block 304 is executed for the first time (i.e., in the first iteration), plane p is used as-is (i.e., with no modification), while in subsequent iterations plane p may be modified (e.g., via an offset, such as an offset in the normal direction; etc.). It should be noted that it is possible that an intersection of a slicing plane and a three-dimensional geometry yields a plurality of two-dimensional geometries, rather than a single two-dimensional geometry. For simplicity of explanation, however, the method is described with respect to a single two-dimensional geometry, and it will be clear to those skilled in the art, after reading the present disclosure, how to adapt the method to work with intersections that yield a plurality of two-dimensional geometries.

At block 305, one or more polylines are obtained. In the first iteration of the method, the polyline(s) might be provided by a user, who can define the polyline(s) in view of one or more objectives (e.g., a particular fiber orientation, maximizing continuity, maximizing strength, maximizing stiffness, minimizing stress, etc.) and/or one or more constraints (e.g., minimum and/or maximum fiber bundle overlap lengths, one or more loading conditions, one or more boundary conditions, etc.), or they might be obtained via a skeletonization process. In one embodiment, the skeletonization process generates a skeleton of the two-dimensional geometry and converts the skeleton into a set of one or more polylines, such that the shape and connectivity of the original two-dimensional geometry are preserved.

In subsequent iterations of block 305 (i.e., after block 312 has been executed, as described below), the polyline(s) are always obtained by skeletonization, where the skeletonization process is applied to a revised two-dimensional geometry obtained at block 311 via subtraction of one or more slender bodies, as is described below.

At block 306, the polyline(s) obtained at block 305 are used in conjunction with preform dimension data (e.g., polyline width, search radius, fillable tolerance, etc.) to generate a number of fillable points in the remainder of the two-dimensional geometry. In one implementation, the polyline(s) are discretized into a set of points $Q=\{q_1, q_2, \ldots, q_N\}$, and each point $q_i$ is then processed by inspecting one or more of its neighboring points within the specified search radius. More particularly, for each point $q_i$, if at least one of the neighboring points of $q_i$ is solid, then point $q_i$ is marked as "not fillable"; otherwise, point $q_i$ is marked as "fillable". In one embodiment, the preform dimension data is provided by a user, and the search radius is the radius of the preform.

Block 307 checks whether a stopping criterion is met. In one implementation, the stopping criterion is that there is no more room remaining in the two-dimensional geometry to place another line segment (or by extension, a multi-segment polyline), because of the solid points in the two-dimensional geometry. If the stopping criterion is met, which means that the current plane has been filled completely by preforms, then execution proceeds to block 308, which, as described below, checks whether there are any slicing planes left to process. If the stopping criterion is not met, then execution continues at block 309.

It should be noted that some other implementations might employ some other stopping criterion, such as the number of fillable points falling below a minimum threshold. Further, some implementations might employ a plurality of stopping criteria (e.g., a plurality of stopping criteria that must all be met, a plurality of stopping criteria such that only one of the criteria must be met, etc.).

Block 308 (which is reached when the stopping criterion is met) checks whether there are any more slicing planes to process (i.e., whether set P is non-empty). If set P is non-empty, then execution continues back at block 303 to process another slicing plane; otherwise, the method proceeds to block 313, described below.

At block 309 (which is reached when the stopping criterion has not been met) the fillable points in the polyline(s) are processed. In one embodiment, for each fillable point $q_i$, $q_i$ and all of its neighboring points within the specified search radius are designated solid. This serves as a "thickening" process for the one or more one-dimensional polylines, yielding one or more slender bodies. It should be noted that in some other embodiments, some or all of the non-fillable points in the polyline(s) might be processed in addition to the fillable points. In one such embodiment, a filter is applied to all of the points, the result of which designates any given point as solid if and only if that point is within the specified range of one or more of the fillable points.

At block 310, the polyline(s) obtained at block 305 are broken down into segments. More particularly, one or more criteria are used to determine discontinuities of each of the polylines, and the polylines are divided into segments based on these discontinuities. In one implementation, the discontinuities are preferred to be (1) located at the endpoints of a skeleton, and (2) not aggregated at one particular location. Accordingly, the criteria may be defined with these preferences in mind, when possible. In some embodiments, the dividing of the polylines may be further based on one or more constraints (e.g., maximum/minimum number of segments, maximum/minimum bend angles, maximum/minimum bend radii, maximum/minimum segment lengths, minimum/maximum number of bend angles, etc.).

At block 311, a mathematical representation of a preform is generated based on the segmented polyline. In one implementation, the preform is represented by (1) the endpoints of the polyline segments, (2) the diameter of the thickened polyline, and (3) the bend radii at the shared endpoints of contiguous segment pairs, and these preform data are stored in memory (e.g., main memory, persistent storage, etc.) for later use at block 313, as described below).

At block 312, the slender body/bodies obtained at block 309 is/are subtracted from the current two-dimensional geometry, yielding a smaller two-dimensional geometry. When block 312 is executed for the first time, the current two-dimensional geometry is the original two-dimensional geometry obtained at block 304. In subsequent executions of block 312, the current two-dimensional geometry is the original geometry obtained at block 304 minus the slender body/bodies subtracted at prior execution(s) of block 312. After block 312 has completed, execution continues back at block 305 for another skeletonization, this time with respect to the smaller two-dimensional geometry obtained here (i.e., in the current execution of block 312).

At block 313, which is reached when there are no more slicing planes to process (as determined at block 308), one or more constraints (e.g., manufacturing constraints, etc.) may be applied, over and above the constraints used at block 310 to guide the segmentation of polylines. In one embodiment, the constraint(s) are applied to the preform data generated at execution(s) of block 311, which may result in a modification of the preform data.

At block 314, one or more preforms are fabricated based on the preform data. In the case of a plurality of preforms, the fabricated preforms may also be organized into an assemblage (e.g., a preform charge, a layup, etc.) based on the preform data.

At block 315, a component is manufactured from the preforms. After block 315 the method terminates.

Figure 4:
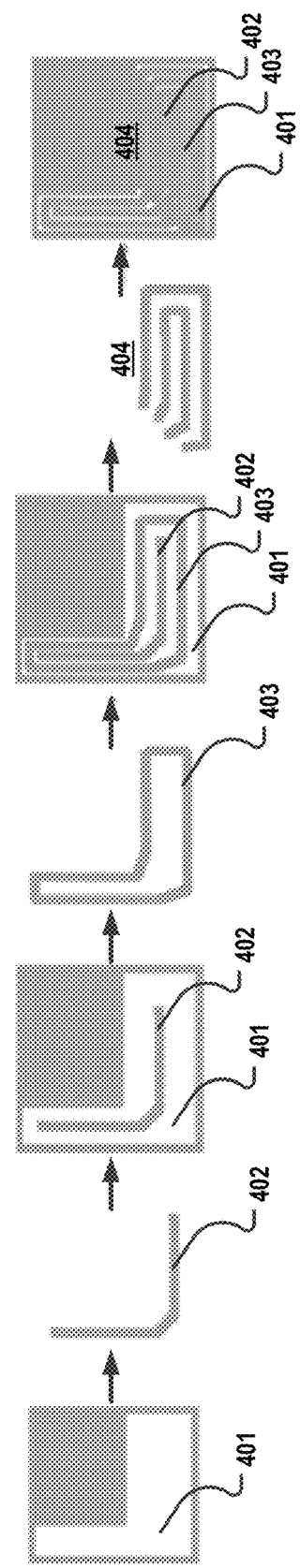
FIG. 4 depicts an example execution of three iterations of a loop of the method of FIGS. 3A and 3B for filling a two-dimensional geometry, in accordance with one embodiment of the present disclosure.

FIG. 4 depicts an example execution of three iterations of loop 305-306-307-309-310-311-312-305 for filling a design space 401 (e.g., a cavity of a mold, etc.), in accordance with one embodiment of the present disclosure. At the first iteration, a first skeleton 402 consisting of one polyline is extracted and added to design space 401; at the second iteration, a second skeleton 403 consisting of one closed polyline is extracted and added to design space 401; and at the third iteration, a third skeleton 404 consisting of two polylines is extracted and added to design space 401. It should be noted that second skeleton 403 could be considered two polylines sharing endpoints, rather than a closed polyline.

Figure 5:
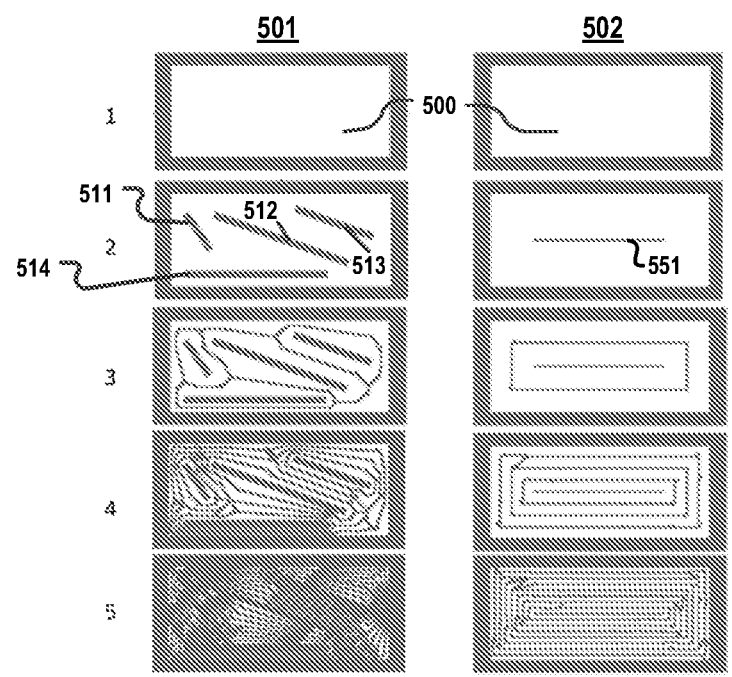
FIG. 5 depicts two examples of executions of the method of FIGS. 3A and 3B, in accordance with one embodiment of the present disclosure.

FIG. 5 depicts two examples of executions—execution 501 and execution 502—of method 300 for a rectangular input geometry 500, in accordance with one embodiment of the present disclosure.

In iteration 1 of execution 501, a user provides initial polylines 511, 512, 513, and 514. In this example, the initial polylines are defined such that they are aligned along the diagonal direction. At subsequent iterations 2, 3, and 4 of execution 501, the polylines are generated via the skeletonization process described above, and become increasingly aligned to the initial diagonal direction.

In iteration 1 of execution 502, an initial single polyline 551 is generated by the skeletonization process. The skeletonization process is performed again at subsequent iterations 2, 3, and 4 of execution 502 to obtain additional polylines. In this example, the progression of polylines through the four iterations is a result of rectangular input geometry 500 being subjected to cantilever loading.

Execution 501 demonstrates that users can define the initial polylines such that the method generates polyline alignments favorable to specific loading conditions. For example, given a stress flow and cantilever loading condition, the use of user-defined initial polylines 511 through 514 in execution 501 produces a stiffer component than execution 502, in which the initial polyline is generated via skeletonization.

Figure 6:
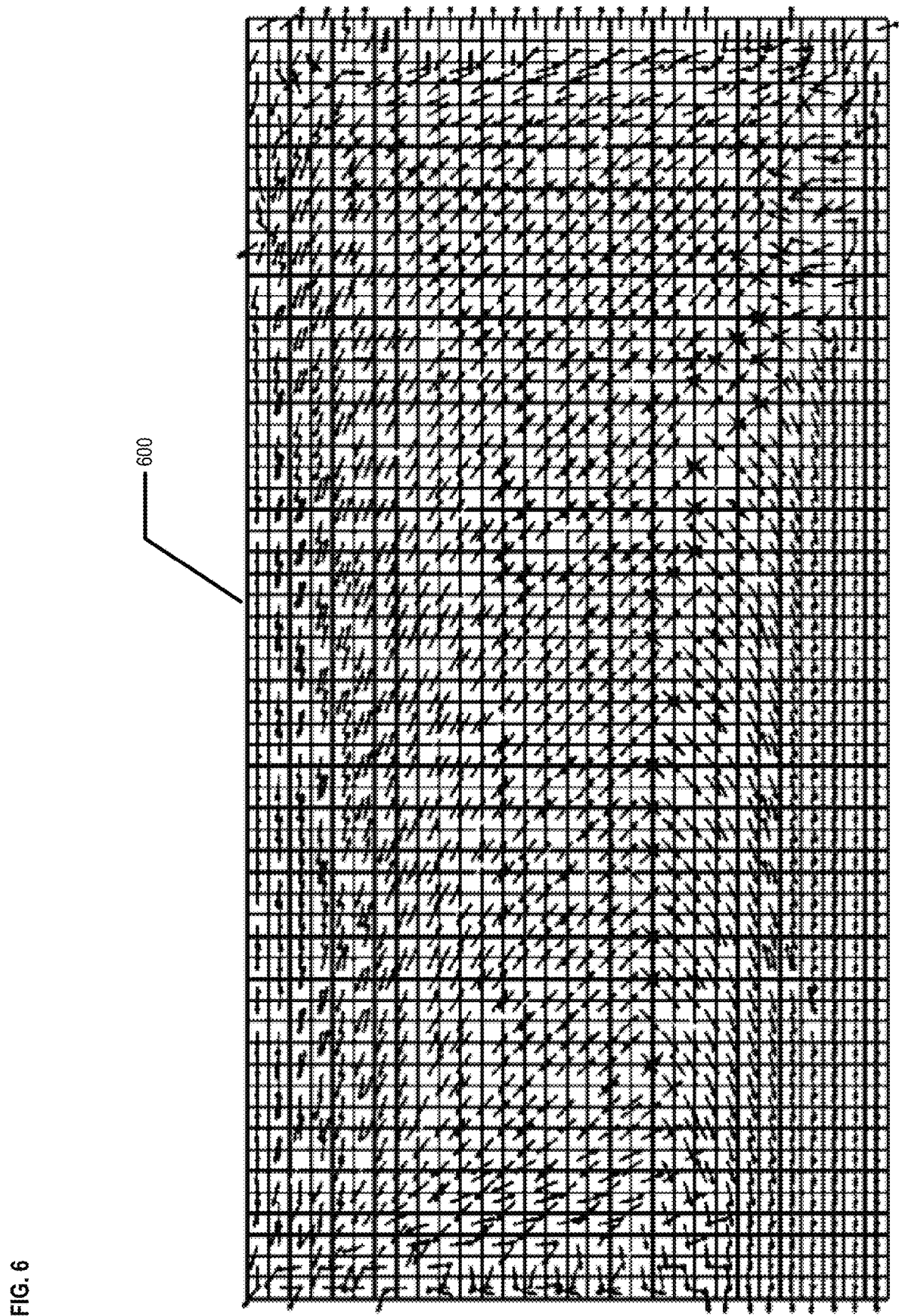
FIG. 6 depicts an example of a stress flow and cantilever loading condition for a two-dimensional cantilever beam under bending, in accordance with one embodiment of the present disclosure.

An example of a stress flow and cantilever loading condition for a two-dimensional rectangular cantilever beam under bending is shown in FIG. 6. This example was generated by a finite element analysis (FEA) simulation.

Figure 7A:
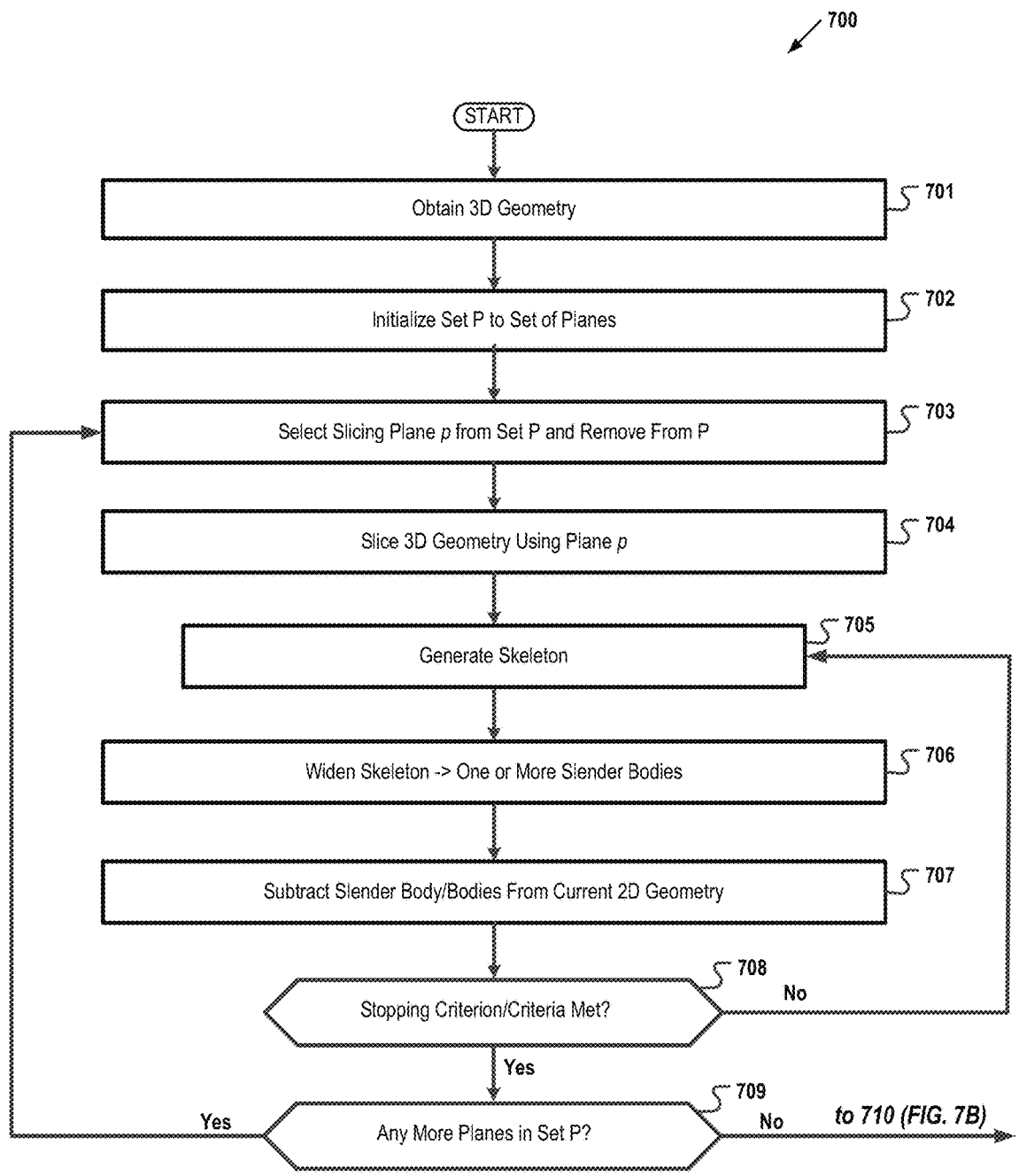
FIGS. 7A and 7B depict a flow diagram of aspects of a method for generating one or more 3D printing tool paths and 3D printing a component using these tool path(s), in accordance with one embodiment of the present disclosure.
Figure 7B:
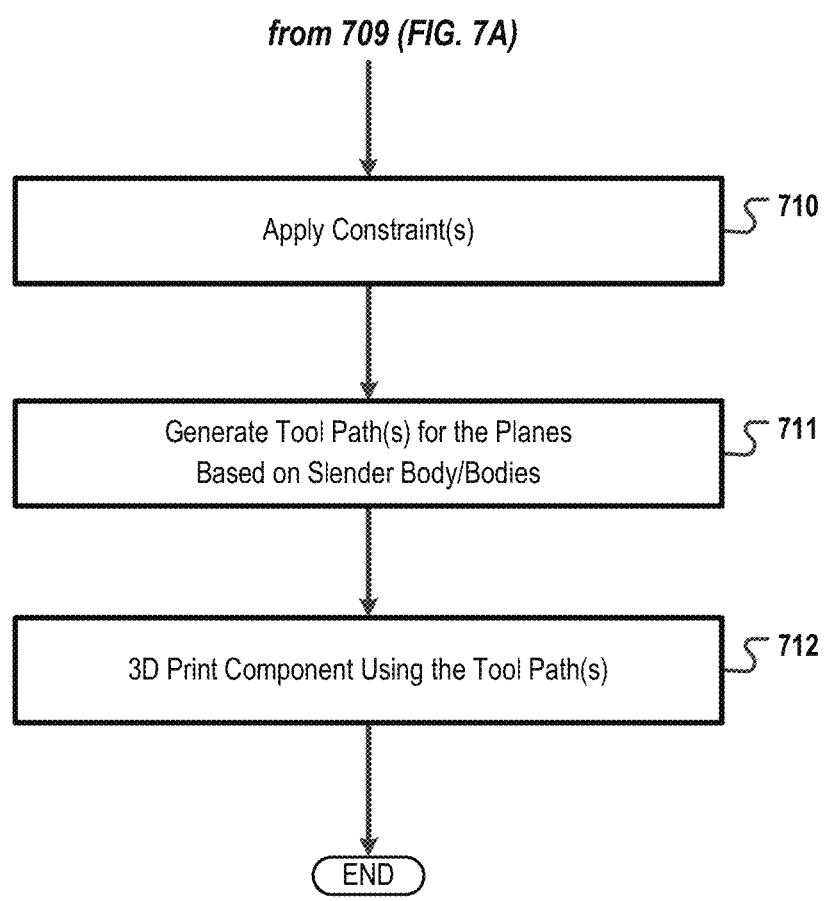

FIGS. 7A and 7B depict a flow diagram of aspects of a method 700 for generating one or more 3D printing tool paths and 3D printing a component using these tool path(s), in accordance with one embodiment of the present disclosure. The method may be performed by processing logic comprising hardware (circuitry, dedicated logic, etc.), software (such as is run on a general-purpose computer system or a dedicated machine), or a combination of both. It should be noted that in some implementations, one or more blocks depicted in FIGS. 7A and 7B might be performed simultaneously, or in a different order than that depicted. In addition, while a single execution of the method is depicted in FIGS. 7A and 7B, the method may be performed multiple times (e.g., a pre-determined number of times, an infinite loop, etc.).

At block 701, a three-dimensional geometry is obtained (e.g., from a Computer-Aided Design [CAD] file, etc.), as in block 301.

At block 702, a set P is initialized to a set of one or more slicing planes. In some embodiments, the slicing planes are stacked in parallel fashion (i.e., having the same orientation), while in other embodiments two or more of the slicing planes might have different orientations. In the latter case, the planes/orientations might be defined by a user, or algorithmically, as in block 302.

At block 703, a slicing plane p in set P is selected and removed from P, as in block 303.

At block 704, a slicing of the three-dimensional geometry is performed in a specified direction using slicing plane p, such that the intersection of p and the three-dimensional geometry yields a two-dimensional geometry, as in block 304. In one embodiment, the specified direction is provided by a user (e.g., at block 701; at block 702; at another block not depicted in FIGS. 7A and 7B that is executed prior to executing block 702; etc.). In one implementation, when block 704 is executed for the first time (i.e., in the first iteration), plane p is used as-is (i.e., with no modification), while in subsequent iterations plane p may be modified (e.g., via an offset, such as an offset in the normal direction; etc.). It should be noted that, as in method 300 of FIGS. 3A and 3B, it is possible that an intersection of a slicing plane and a three-dimensional geometry yields a plurality of two-dimensional geometries, rather than a single two-dimensional geometry. For simplicity of explanation, this method is similarly described with respect to a single two-dimensional geometry, and it will be clear to those skilled in the art, after reading the present disclosure, how to adapt this method to work with intersections that yield a plurality of two-dimensional geometries.

At block 705, a skeleton of the two-dimensional geometry is generated, as in block 305.

At block 706, the skeleton obtained at block 705 is widened into one or more slender bodies in accordance with the diameter of the extrusion tool.

At block 707, the slender body/bodies obtained at block 706 are subtracted from the current two-dimensional geometry, yielding a smaller two-dimensional geometry. When block 707 is executed for the first time, the current two-dimensional geometry is the original two-dimensional geometry obtained at block 704. In subsequent executions of block 707, the current two-dimensional geometry is the original geometry obtained at block 704 minus the slender body/bodies obtained at prior execution(s) of block 707.

Block 708 checks whether a stopping criterion is met. In one implementation, the stopping criterion is that the area of the current two-dimensional geometry has fallen below a threshold (e.g., below 3 cm$^2$, etc.). If the stopping criterion is not met, then execution continues back at block 705; otherwise, execution proceeds to block 709.

It should be noted that some other implementations might employ some other stopping criterion (e.g., the current two-dimensional geometry becoming too small to hold a slender body of 10 mm length, etc.). Further, some implementations might employ a plurality of stopping criteria (e.g., a plurality of stopping criteria that must all be met, a plurality of stopping criteria such that only one of the criteria must be met, etc.).

Block 709 (which is reached when the stopping criterion is met) checks whether there are any more slicing planes to process (i.e., whether set P is non-empty). If set P is non-empty, then execution continues back at block 703 to process another slicing plane; otherwise, the method proceeds to block 710.

At block 710, one or more constraints (e.g., manufacturing constraints, etc.) may be applied. In one embodiment, the constraint(s) are applied to the slender body/bodies generated at execution(s) of block 706, which may result in a modification of or removal of one or more of the slender body/bodies. It should be noted that in some examples, constraints may not be necessary or applicable, in which case block 710 will be unnecessary.

At block 711, tool path(s) for the plane(s) are generated based on the remaining slender body/bodies (i.e., slender body/bodies that were not removed at block 710), where each of the remaining slender body/bodies may be either unmodified or modified/constrained as dictated by the constraint(s) (or absence of constraints).

At block 712 a component is 3D printed using the tool path(s) generated at block 711. It should be noted that in some examples there might be a plurality of tool paths for any given plane (i.e., not necessarily one path per plane). For example, there might be one tool path in a first plane, three tool paths in a second plane, one tool path in a third plane, two tool paths in a fourth plane, etc. After block 712 the method terminates.

Figure 8A:
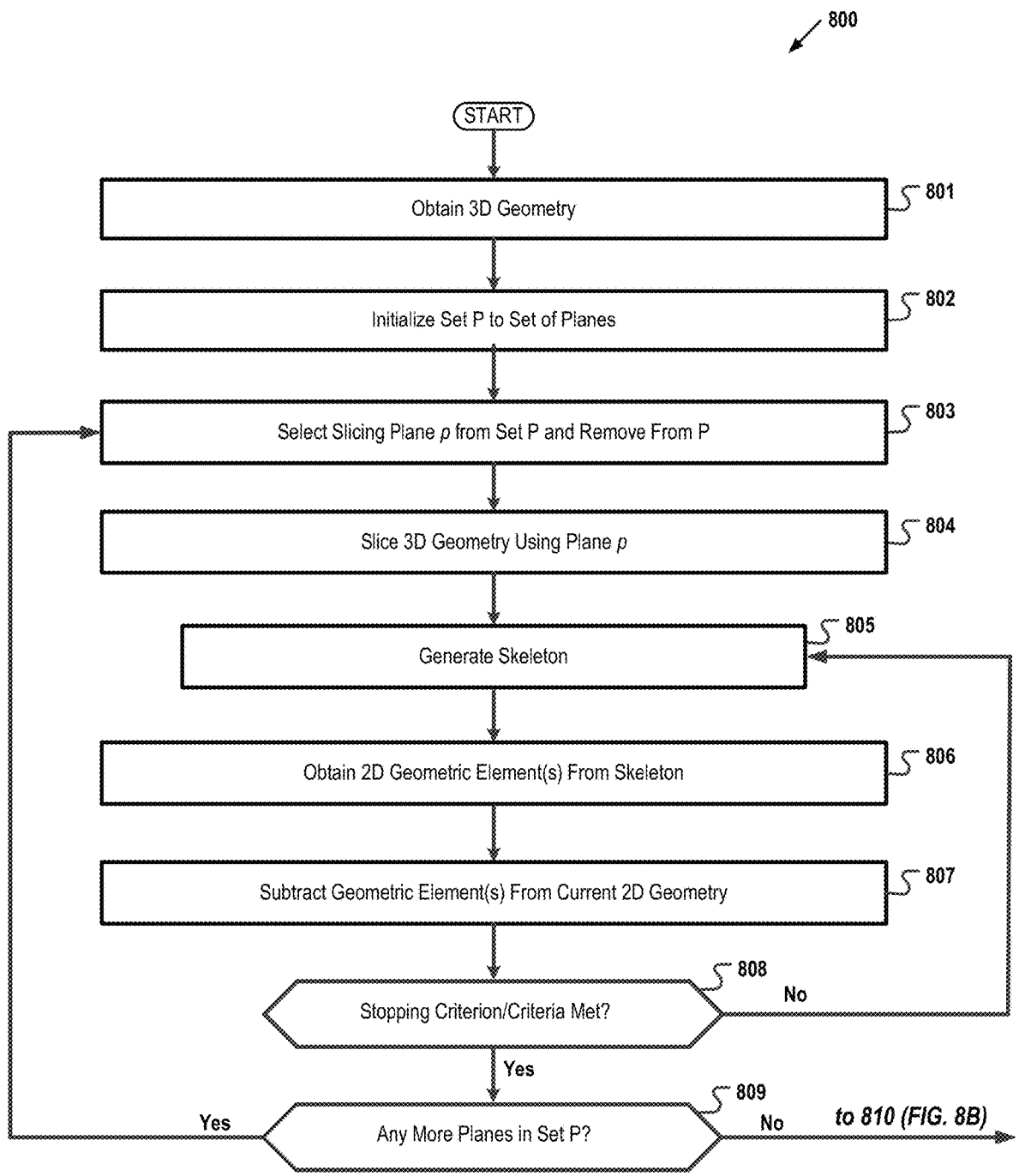
FIGS. 8A and 8B depict a flow diagram of aspects of a method for generating one or more paths and additively manufacturing a component using these path(s), in accordance with one embodiment of the present disclosure.
Figure 8B:
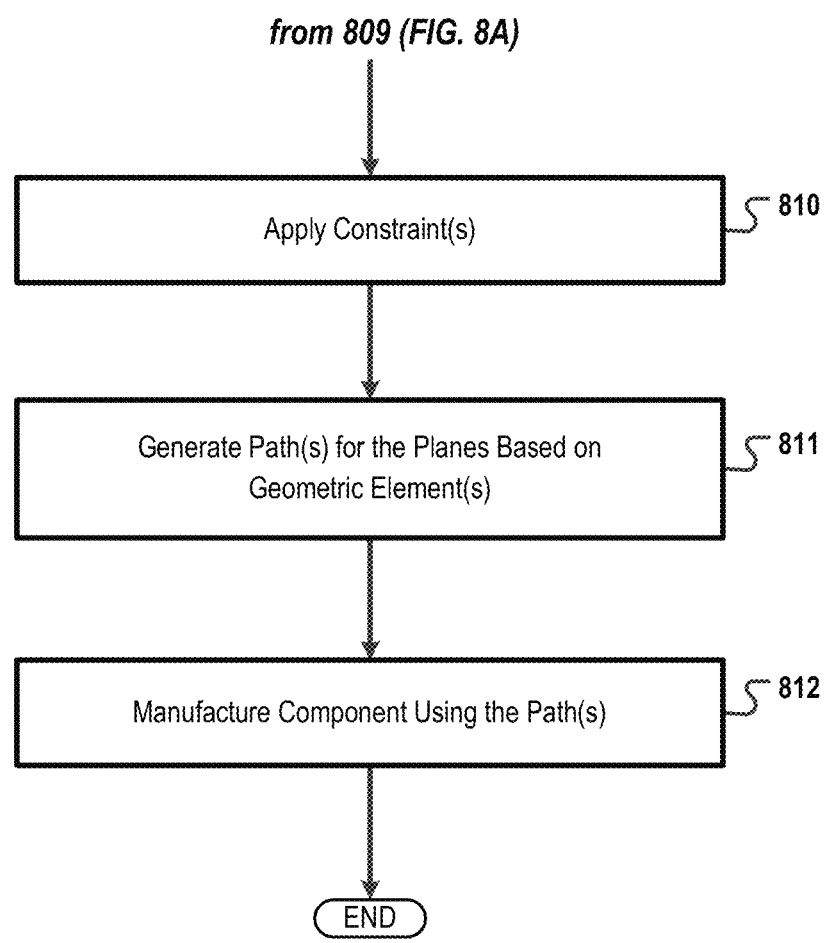

FIGS. 8A and 8B depict a flow diagram of aspects of a method 800 for generating one or more paths and additively manufacturing a component using these path(s), in accordance with one embodiment of the present disclosure. The method is applicable to any additive manufacturing technology that employs paths to produce components. The method may be performed by processing logic comprising hardware (circuitry, dedicated logic, etc.), software (such as is run on a general-purpose computer system or a dedicated machine), or a combination of both. It should be noted that in some implementations, one or more blocks depicted in FIGS. 8A and 8B might be performed simultaneously, or in a different order than that depicted. In addition, while a single execution of the method is depicted in FIGS. 8A and 8B, the method may be performed multiple times (e.g., a pre-determined number of times, an infinite loop, etc.).

At block 801, a three-dimensional geometry is obtained (e.g., from a Computer-Aided Design [CAD] file, etc.).

At block 802, a set P is initialized to a set of one or more slicing planes. In some embodiments, the slicing planes are stacked in parallel fashion (i.e., having the same orientation), while in other embodiments two or more of the slicing planes might have different orientations. In the latter case, the planes/orientations might be defined by a user, or algorithmically.

At block 803, a slicing plane p in set P is selected and removed from P.

At block 804, a slicing of the three-dimensional geometry is performed in a specified direction using slicing plane p, such that the intersection of p and the three-dimensional geometry yields a two-dimensional geometry. In one embodiment, the specified direction is provided by a user (e.g., at block 801; at block 802; at another block not depicted in FIGS. 8A and 8B that is executed prior to executing block 802; etc.). In one implementation, when block 804 is executed for the first time (i.e., in the first iteration), plane p is used as-is (i.e., with no modification), while in subsequent iterations plane p may be modified (e.g., via an offset, such as an offset in the normal direction; etc.). It should be noted that, as in methods 300 and 700, it is possible that an intersection of a slicing plane and a three-dimensional geometry yields a plurality of two-dimensional geometries, rather than a single two-dimensional geometry. For simplicity of explanation, this method is similarly described with respect to a single two-dimensional geometry, and it will be clear to those skilled in the art, after reading the present disclosure, how to adapt this method to work with intersections that yield a plurality of two-dimensional geometries.

At block 805, a skeleton of the two-dimensional geometry is generated.

At block 806, one or more geometric elements (e.g., polylines, slender bodies, etc.) are obtained from the skeleton.

At block 807, the geometric element(s) obtained at block 806 are subtracted from the current two-dimensional geometry, yielding a smaller two-dimensional geometry. When block 807 is executed for the first time, the current two-dimensional geometry is the original two-dimensional geometry obtained at block 804. In subsequent executions of block 807, the current two-dimensional geometry is the original geometry obtained at block 804 minus the geometric element(s) obtained at prior execution(s) of block 807.

Block 808 checks whether one or more stopping criteria are met (e.g., a property of the current two-dimensional geometry, a property of one or more of the geometric elements, etc.). If the stopping criterion/criteria is/are not met, then execution continues back at block 805; otherwise, execution proceeds to block 809.

It should be noted that when there are a plurality of criteria, in some examples all of the criteria might have to be met, while in some other examples only one of the criteria might have to be met.

Block 809 (which is reached when the stopping criterion/criteria is/are met) checks whether there are any more slicing planes to process (i.e., whether set P is non-empty). If set P is non-empty, then execution continues back at block 803 to process another slicing plane; otherwise, the method proceeds to block 810.

At block 810, one or more constraints (e.g., manufacturing constraints, etc.) may be applied. In one embodiment, the constraint(s) are applied to the geometric element(s) generated at execution(s) of block 806, which may result in a modification of or removal of one or more of the elements. It should be noted that in some examples, constraints may not be necessary or applicable, in which case block 810 will be unnecessary.

At block 811, path(s) for the plane(s) are generated based on the remaining geometric element(s) (i.e., geometric element(s) that were not removed at block 810), where each of the remaining element (s) may be either unmodified or modified/constrained as dictated by the constraint(s) (or absence of constraints).

At block 812 a component is manufactured using the path(s). It should be noted that in some examples there might be a plurality of paths for any given plane (i.e., not necessarily one path per plane). After block 812 the method terminates.

Figure 9:
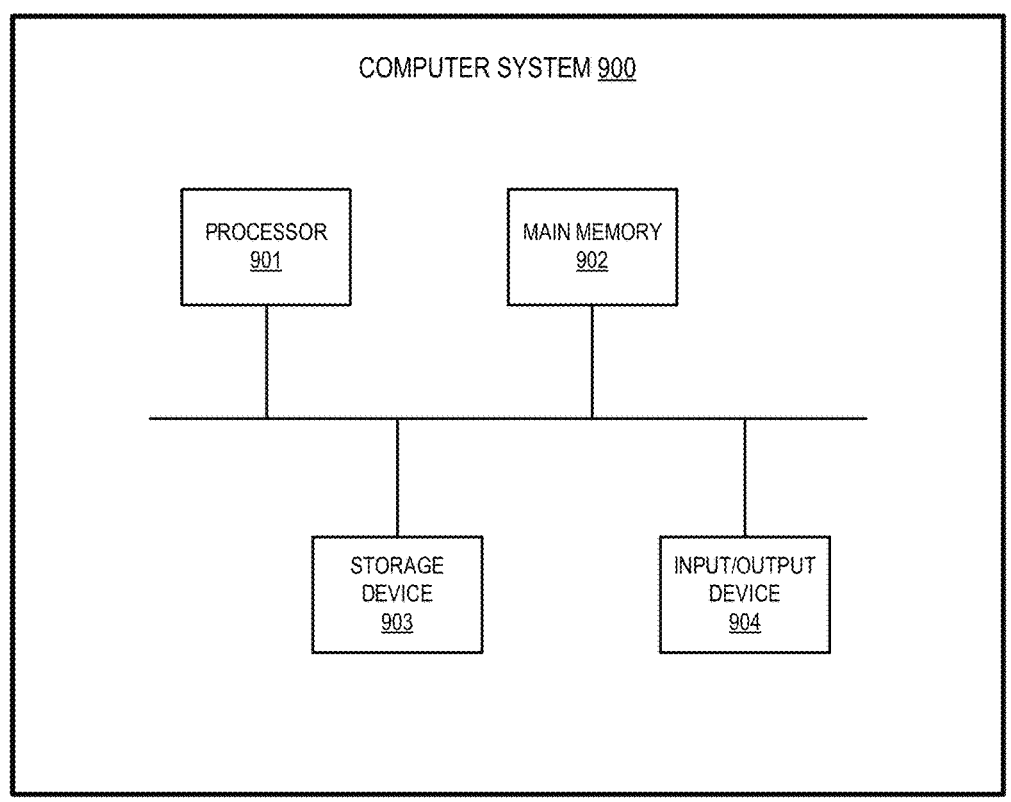
FIG. 9 depicts a block diagram of an illustrative computer system operating in accordance with aspects and implementations of the present disclosure.

FIG. 9 depicts a block diagram of an illustrative computer system 900 operating in accordance with aspects and implementations of the present disclosure. Computer system 900 may be a personal computer (PC), a laptop computer, a tablet computer, a smartphone, or any other computing or communication device. As shown in FIG. 9, computer system 900 comprises processor 901, main memory 902, storage device 903, and input/output (I/O) device 904, interconnected as shown (e.g., via one or more busses, etc.).

Processor 901 represents one or more general-purpose processing devices such as a microprocessor, central processing unit, or the like. More particularly, processor 901 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 901 may also be one or more special-purpose processing devices such as an application specific integrated circuit (ASIC), a field programmable gate array (FPGA), a digital signal processor (DSP), network processor, or the like. Processor 901 is capable of executing instructions stored in main memory 902 and storage device 903, including instructions corresponding to the methods of FIGS. 3A/3B, 7A/7B and 8A/8B; of reading data from and writing data into main memory 902 and storage device 903; and of receiving input signals and transmitting output signals to input/output device 904. While a single processor is depicted in FIG. 9 for simplicity, computer system 900 might comprise a plurality of processors.

Main memory 902 is capable of storing executable instructions and data, including instructions and data corresponding to the methods of FIGS. 3A/3B, 7A/7B and 8A/8B, and may include volatile memory devices (e.g., random access memory [RAM]), non-volatile memory devices (e.g., flash memory), and/or other types of memory devices.

Storage device 903 is capable of persistent storage of executable instructions and data, including instructions and data corresponding to the methods of FIGS. 3A/3B, 7A/7B and 8A/8B, and may include a magnetic hard disk, a Universal Serial Bus [USB] solid state drive, a Redundant Array of Independent Disks [RAID] system, a network attached storage [NAS] array, etc. While a single storage device is depicted in FIG. 9 for simplicity, computer system 900 might comprise a plurality of storage devices.

I/O device 904 receives input signals from a user of computer system 900, forwards corresponding signals to processor 901, receives signals from processor 901, and emits corresponding output signals that can be sensed by the user. The input mechanism of I/O device 904 might be an alphanumeric input device (e.g., a keyboard, etc.), a touchscreen, a cursor control device (e.g., a mouse, a trackball, etc.), a microphone, etc., and the output mechanism of I/O device 904 might be a liquid-crystal display (LCD), a cathode ray tube (CRT), a speaker, etc. While a single I/O device is depicted in FIG. 9 for simplicity, computer system 900 might comprise a plurality of I/O devices.

It is to be understood that the above-described embodiments are merely illustrative, and that many variations of the above-described embodiments can be devised by those skilled in the art without departing from the scope of this disclosure. It is therefore intended that such variations be included within the scope of the following claims and their equivalents.

What is claimed:

1. A method for producing one or more components via an additive manufacturing process, the method comprising:
   slicing a three-dimensional geometry using a slicing plane;
   computing an intersection between the slicing plane and the three-dimensional geometry to obtain a first two-dimensional geometry;

generating a first skeleton of the first two-dimensional geometry;

generating a first polyline based on the first skeleton;

generating a first slender body based on the first polyline;

dividing the first polyline into a first plurality of contiguous segments based on one or more manufacturing constraints of the additive manufacturing process, the first plurality of contiguous segments comprising a first segment and a second segment adjacent to the first segment;

producing a first bundle of fibers based on a first endpoint shared by the first and second segments and on a bend radius at the first endpoint;

subtracting the first slender body from the first two-dimensional geometry to obtain a second two-dimensional geometry;

generating a second skeleton of the second two-dimensional geometry;

generating a second polyline based on the second skeleton;

dividing the second polyline into a second plurality of contiguous segments comprising a third segment and a fourth segment adjacent to the third segment;

producing a second bundle of fibers based on a second endpoint shared by the third and fourth segments and on a bend radius at the second endpoint; and producing a component from the first and second bundles of fibers using the additive manufacturing process.

2. The method of claim 1 wherein the one or more manufacturing constraints comprises at least one of a minimum number of segments or a maximum number of segments.

3. The method of claim 1 wherein the one or more manufacturing constraints comprises at least one of a minimum bend angle or a maximum bend angle.

4. The method of claim 1 wherein the one or more manufacturing constraints comprises at least one of a minimum segment length or a maximum segment length.

5. The method of claim 1 wherein the one or more manufacturing constraints comprises at least one of a minimum fiber bundle overlap length or a maximum fiber bundle overlap length.

6. The method of claim 1 wherein the slicing is performed in a direction specified by a user.

7. The method of claim 1 wherein the generating of the first slender body based on the first polyline comprises:

discretizing the first polyline into a plurality of points;

identifying a first point of the plurality of points and a set of one or more neighboring points of the first point within a specified distance of the first point; and including the first point in the first slender body only when none of the one or more neighboring points within the specified distance are included in the first slender body.

8. A method for producing one or more components via an additive manufacturing process, the method comprising:

slicing a three-dimensional geometry using a slicing plane;

computing an intersection between the slicing plane and the three-dimensional geometry to obtain a first two-dimensional geometry;

determining, based on one or more manufacturing constraints of the additive manufacturing process, a geometry for a first polyline situated within the first two-dimensional geometry;

generating a first slender body based on the first polyline;

dividing the first polyline into a first plurality of contiguous segments comprising a first segment and a second segment adjacent to the first segment;

producing a first bundle of fibers based on a first endpoint shared by the first and second segments and on a bend radius at the first endpoint;

subtracting the first slender body from the first two-dimensional geometry to obtain a second two-dimensional geometry;

generating a second polyline based on a skeleton of the second two-dimensional geometry;

dividing the second polyline into a second plurality of contiguous segments comprising a third segment and a fourth segment adjacent to the third segment;

producing a second bundle of fibers based on a second endpoint shared by the third and fourth segments and on a bend radius at the second endpoint; and producing a component from the first and second bundles of fibers using the additive manufacturing process.

9. The method of claim 8 wherein the determining of the geometry of the first polyline is also based on one or more objectives, the one or more objectives comprising an orientation of a first bundle of fibers in the component.

10. The method of claim 8 wherein the determining of the geometry of the first polyline is also based on one or more objectives, the one or more objectives comprising maximizing strength.

11. The method of claim 8 wherein the determining of the geometry of the first polyline is also based on one or more objectives, the one or more objectives comprising minimizing stress.

12. The method of claim 8 wherein the determining of the geometry of the first polyline is also based on one or more loading conditions.

13. The method of claim 8 wherein the dividing of the first polyline is based on at least one of the one or more manufacturing constraints.

14. A method for producing one or more components via an additive manufacturing process, the method comprising:

slicing a three-dimensional geometry using a first slicing plane;

computing a first intersection between the first slicing plane and the three-dimensional geometry to obtain a first two-dimensional geometry;

determining, based on one or more manufacturing constraints of the additive manufacturing process, a geometry for a first polyline situated within the first two-dimensional geometry;

generating a first slender body based on the first polyline;

producing a first bundle of fibers based on the first slender body;

slicing the three-dimensional geometry using a second slicing plane;

computing a second intersection between the second slicing plane and the three-dimensional geometry to obtain a second two-dimensional geometry;

generating a skeleton of the second two-dimensional geometry;

generating a second polyline based on the skeleton;

producing a second bundle of fibers based on the second polyline; and producing a component from the first and second bundles of fibers using the additive manufacturing process.

15. The method of claim 14 wherein the generating of the first slender body is based on a first point on the first polyline and a second point that is not on the first polyline.

16. The method of claim 14 wherein the first slicing plane and the second slicing plane have different orientations.

17. The method of claim 14 wherein the second slicing plane is offset from the first slicing plane based on a normal of the first plane.

18. The method of claim 8 wherein the dividing of the first polyline is based on a manufacturing constraint that is different than the one or more manufacturing constraints.

* * * * *